US012761943B2

(12) United States Patent
V et al.

(10) Patent No.: US 12,761,943 B2
(45) Date of Patent: Oct. 13, 2026

(54) ORPHAN CONTAINER MANAGEMENT IN CONTAINERIZED ENVIRONMENTS

(71) Applicant: SAP SE, Walldorf (DE)

(72) Inventors: Sreeram V, Palakkad (IN); Shivkumar Chakkenchath, San Ramon, CA (US); Sreekanth Kozhisseri Pattath, Bangalore (IN); Vidhya K, Bangalore (IN); Sudheernath Reddy Kaipa, Kadapa (IN); Wei Li, Shanghai (CN)

(73) Assignee: SAP SE, Walldorf (DE)

( * ) Notice: Subject to any disclaimer, the term of this patent is extended or adjusted under 35 U.S.C. 154(b) by 394 days.

(21) Appl. No.: 18/625,472

(22) Filed: Apr. 3, 2024

(65) Prior Publication Data

US 2025/0315287 A1 Oct. 9, 2025

(51) Int. Cl.
*G06F 9/455* (2018.01)

(52) U.S. Cl.
CPC .................... *G06F 9/45558* (2013.01); *G06F 2009/45562* (2013.01)

(58) Field of Classification Search
None
See application file for complete search history.

(56) References Cited

U.S. PATENT DOCUMENTS

| | | | | |
|---|---|---|---|---|
| 9,727,470 | B1 | 8/2017 | Cande et al. | |
| 9,959,280 | B1 | 5/2018 | Whitehead et al. | |
| 10,706,014 | B1 | 7/2020 | Gupta et al. | |
| 10,958,730 | B2 * | 3/2021 | Perez | H04L 67/131 |

(Continued)

OTHER PUBLICATIONS

Dabrowski et al.; "VM Leakage and Orphan Control in Open-Source Clouds"; 2011 third IEEE International Conference on Cloud Computing Technology and Science; (Dabrowski_2011.pdf) (Year: 2011).*

(Continued)

*Primary Examiner* — Hiren P Patel
(74) *Attorney, Agent, or Firm* — Buckley, Maschoff & Talwalkar LLC

(57) ABSTRACT

Briefly, embodiments of a system, method, and article for scanning a database for a containerized environment to acquire information for a set of containers for applications. The information may include at least namespace associations and metadata for individual containers of the set of containers. One or more orphan containers may be detected within the set of containers for applications, where the one or more orphan containers may be associated with unknown owner information. Defined rules may be applied to determine owner information for at least one of the one or more orphan containers based at least in part on the namespace associations and metadata for the at least one of the one or more orphan containers. The determined owner information for the at least one of the one or more orphan containers may be stored in a storage device. A time may be initialized in response to detecting at least one remaining orphan container of the one or more orphan containers for which the owner information remains unknown in response to the applying of the defined rules to determine the owner information. The at least one remaining orphan container for which owner information remains unknown may be deleted in response to expiration of the timer.

16 Claims, 6 Drawing Sheets

(56) References Cited

U.S. PATENT DOCUMENTS

| | | | | |
|---|---|---|---|---|
| 11,321,185 | B2 * | 5/2022 | Srinivasan | G06F 11/1451 |
| 11,422,743 | B2 | 8/2022 | Kandiyanallur et al. | |
| 12,455,966 | B1 * | 10/2025 | Lande Blau | G06F 21/566 |
| 2008/0307175 | A1 | 12/2008 | Hart et al. | |
| 2016/0139949 | A1 * | 5/2016 | Jagannath | G06F 9/5022 718/1 |
| 2020/0106834 | A1 * | 4/2020 | Perez | H04L 67/1097 |
| 2020/0349023 | A1 * | 11/2020 | Srinivasan | G06F 11/1451 |
| 2021/0064479 | A1 * | 3/2021 | Kumar | G06F 11/1451 |
| 2022/0240434 | A1 * | 8/2022 | Rice | A01B 79/005 |
| 2024/0241740 | A1 * | 7/2024 | Shah | G06F 9/45558 |
| 2024/0248748 | A1 * | 7/2024 | Jha | G06F 9/4856 |

OTHER PUBLICATIONS

Bhan et al.; "VM Availability in Presence of Malicious Attacks in Open-Source Cloud"; 2019 IEEE; (Bhan_2019.pdf) (Year: 2019).*

* cited by examiner

ORPHAN CONTAINER MANAGEMENT IN CONTAINERIZED ENVIRONMENTS

BACKGROUND

Containerization is a software deployment process that bundles an application's code with all the files and libraries it needs to run on any infrastructure. Traditionally, for a user to run an application on the user's computer, the user had to install a version of the application which matched the user's computer's operating system. For example, the user might need to install a Windows™ version of a software package on a Windows™ machine. However, with containerization, one may create a single software package, or container, which runs on all types of devices and operating systems.

Containerization involves building self-sufficient software packages that perform consistently, regardless of the machines they run on. Software developers may create and deploy container images, e.g., files which contain the necessary information to run a containerized application. Developers use containerization tools to build container images based on the Open Container Initiative (OCI) image specification. OCI is an open-source group which provides a standardized format for creating container images. Container images are read-only and cannot be altered by the computer system.

A problem arises in containerized environments where numerous containers are deployed within namespaces. In such containerized environments, it becomes crucial to ensure that each container has a designated owner responsible for its management, security, and resource allocation. However, due to various factors such as human error, misconfigurations, or dynamic changes in organizational structures, containers may become orphaned, meaning they lack a valid owner assignment. The presence of orphan containers within a containerized environment may result in wasted storage space and computing bandwidth, for example.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
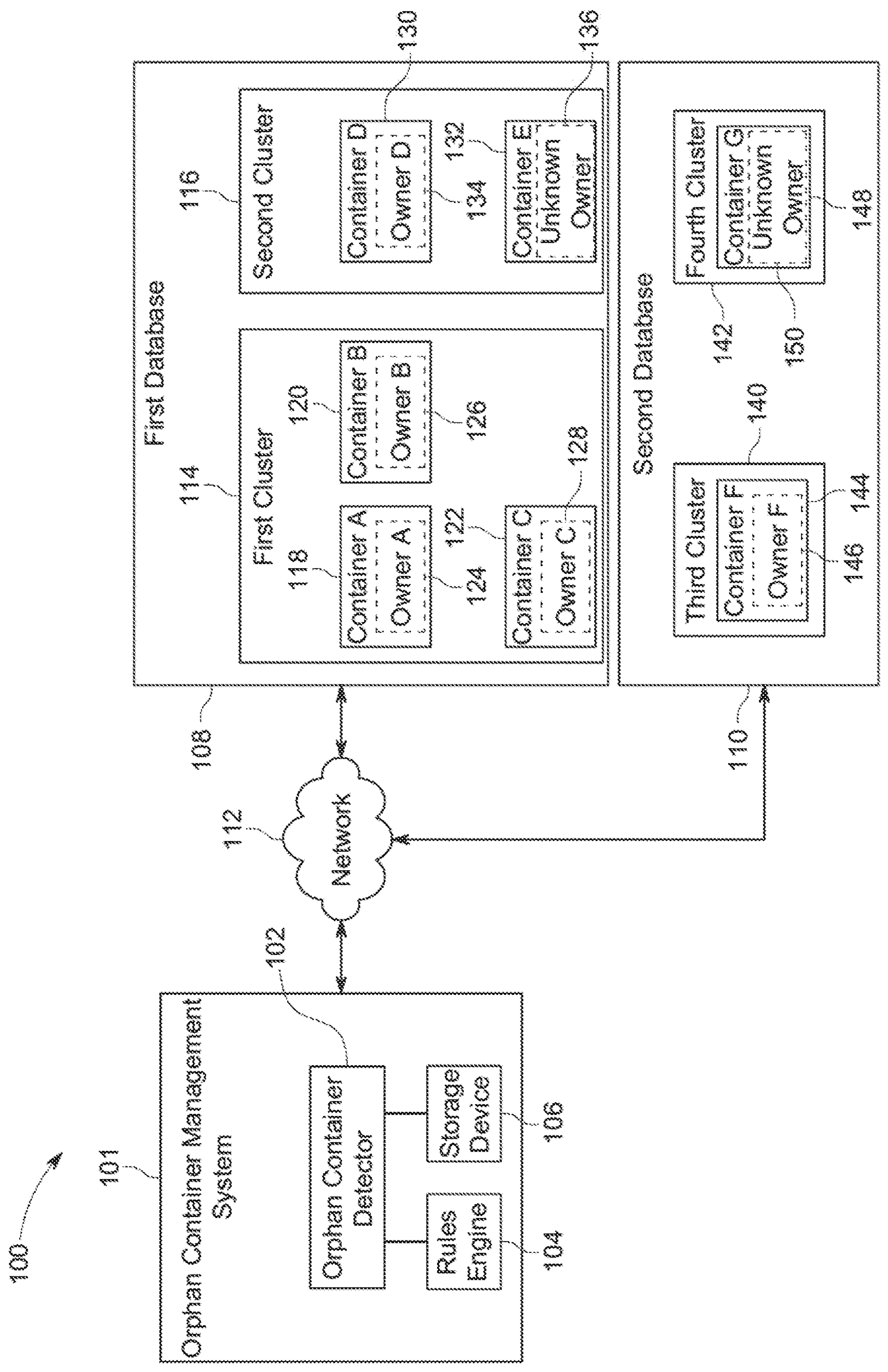
FIG. 1 illustrates a system for detecting orphan containers according to an embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art will readily understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded a scope consistent with the principles and features disclosed herein.

Containerization is a form of virtualization where applications run in isolated user spaces, called containers, while using the same shared operating system (OS). A "container," as used herein, refers to a class or a data structure whose instances are collections of other objects. A container may store objects in an organized way that follows specific access rules. One of the benefits of containerization is that a container is essentially a fully packaged and portable computing environment. Everything an application needs to run—its binaries, libraries, configuration files, and dependencies—is encapsulated and isolated in its container.

There are different platforms for managing containerized environments, such as Kubernetes™ and Docker™. Kubernetes™, for example, is an open-source container orchestration platform. Kubernetes™ is designed to automate the deployment, scaling and management of containerized applications. Kubernetes™ may help to organize multiple containers in a cluster of computers, ensuring high availability and fault tolerance. Kubernetes™ provides features for load balancing, scaling, and rolling updates, to name just a few examples among many. Kubernetes™ uses declarative configuration to define how applications should run, allowing it to automatically handle the underlying infrastructure.

Within a containerized environment, a container itself is abstracted away from a host OS, with only limited access to underlying resources, much like a lightweight virtual machine (VM). As a result, a containerized application may be run on various types of infrastructure, such as on bare metal, within VMs, and in the cloud without needing to refactor the containerized application for each environment.

Each container comprises an executable package of software, running on top of a host OS. A host may support many containers (tens, hundreds, or even thousands) concurrently, such as in the case of a complex microservices architecture that uses numerous containerized application delivery controllers (ADCs). Such a setup works because all containers run minimal, resource-isolated processes that other containers cannot access.

A containerized application is similar to the top layer of a multi-tier cake. At the bottom, the hardware of the infrastructure in question, including its CPU(s), disk storage, and network interfaces, may be located. Above that is a host OS and the host OS's kernel, where the kernel serves as a bridge between the software of the OS and the hardware of the underlying system. A container engine and its minimal guest OS, which are particular to the containerization technology being used, sit atop the host OS. At the very top are binaries and libraries (bins/libs) for each application and the applications themselves, running in their isolated user spaces (containers).

There are many benefits of containerization. Containerized applications may be readily delivered to users in a virtual workspace. For example, containerizing a microservices-based application, ADCs, or a database (among other possibilities) may provide a broad spectrum of distinctive benefits, ranging from superior agility during software development to easier cost controls.

A container does not require a full guest OS or a hypervisor. Corresponding reduced overhead translates into faster boot times, smaller memory footprints and generally better performance. Containerization also helps reduce costs, because organizations may reduce some of their server or database and licensing costs, which would have otherwise gone toward supporting a heavier deployment of multiple VMs. Accordingly, containers enable greater database or server efficiency and cost-effectiveness.

A container may be deployed within a namespace. A "namespace," as used herein, refers to a set of signs (names) that are used to identify and refer to objects of various kinds. A namespace may ensure that each of a given set of objects have unique names so that they may be readily and easily identified. Namespaces may be structured as hierarchies to allow reuse of names in different contexts.

A Kubernetes™ cluster is a set of nodes that run containerized applications. Containerizing applications packages an app with its dependences and some necessary services. Kubernetes™ clusters allow for applications to be more easily developed, moved and managed. Kubernetes™ clusters allow containers to run across multiple machines and environments: virtual, physical, cloud-based, and on-premises.

A container is typically associated with a particular owner. In a particular Kubernetes™ cluster, there may be potentially hundreds of different containers. For example, within a particular organization, there may be many different software developers creating and deploying containerized applications within the same cluster. A problem arises, however, in a containerized environment where numerous containers are deployed within namespaces of a cluster if the owner of a container is unknown. If numerous containers are deployed within namespaces, it becomes crucial to ensure that each container has a designated owner responsible for its management, security, and resource allocation. However, due to various factors such as human error, misconfigurations, or dynamic changes in organizational structures, some containers may become orphaned. An "orphaned" container, as used herein, refers to a container which lacks valid ownership. In other words, the owner of an orphaned container may be unknown. If there is a relatively large number of orphaned containers, system throughput may be adversely affected because, for example, processing power and/or storage capacity may be wasted on orphaned containers.

It may be important to know who the owner of a container is so that if there is a vulnerability or potential security issue, the owner of the container may be contacted and informed of the vulnerability so that the vulnerability may be remedied. For example, the owner may deploy a security patch to fix such a vulnerability. However, if the owner of the container is unknown, then it may be impossible to pinpoint the exact owner of the container. For example, a cluster in which containers are located may be utilized within a shared environment for an organization, such as a business. If the organization or business is relatively large, there may be potentially hundreds of different teams within the organization which are deploying applications to a Kubernetes™ cluster. Some of the application may be test applications which are deployed during a testing phase. However, the development of some of the test applications may end up being no longer pursued and/or effectively abandoned if a particular team decides to work on a different application. In such an example, there is a possibility that the team may forget to remove the container from the Kubernetes™ cluster, thereby resulting in wasted computing and/or storage bandwidth.

In accordance with an embodiment, systems and methods are provided which automate a process of assigning ownership to containers and detect orphan containers in a timely and accurate manner. Mechanisms may be implemented to define ownership rules, evaluate container and namespace attributes, analyze container metadata, and integrate with external systems or databases to fetch relevant ownership information. A comprehensive orphan container management system may minimize manual intervention, enhance security, optimize resource allocation, and improve overall container management efficiency.

By addressing the orphaning of containers in an efficient and at least partially automated process, organizations may mitigate risks associated with orphan containers, improve accountability, streamline management processes, and ensure the optimal utilization of container resources.

FIG. 1 illustrates a system 100 for detecting orphan containers according to an embodiment. System 100 may include an orphan container detector 102. Orphan container detector 102 may be in communication with a rules engine 104 and a storage device 106. Rules engine 104 may contain rules usable by orphan container detector 102 to detect a container for which an owner is unknown. Rules engine 104 may additionally include rules for determining a likely owner of a container. Storage device 106 may be utilized to store various information, such as instructions executable by a processor of orphan container detector 102. Storage device 106 may also contain information indicating the names or identities of various containers and the associated owners of such containers in accordance with an embodiment.

Orphan container detector 102 may be in communication with a first database 108 and a second database 110 via a network 112, such as the Internet, for example. Two databases are shown in FIG. 1 for the sake of brevity, but it should be appreciated that more or fewer than two databases and/or servers may be included in a system 100 in accordance with various embodiments. Each database may include one or more clusters in which one or more containers may be implemented or otherwise located. For example, first database 108 may include first cluster 114 and a second cluster 116. First cluster 114 may include Container A 118, Container B 120, and Container C 122. Container A 118 may be associated with Owner A 124. Container B 120 may be associated with Owner B 126. Container C 122 may be associated with Owner C 128. Second cluster 116 may include Container D 130 and Container #132. Container D 130 may be associated with Owner D 134. However, Container E 132 may be associated with an unknown owner 136.

Second database 110 may include a third cluster 140 and a fourth cluster 142. Third cluster 140 may include Container F 144, which is associated with Owner F 146. Fourth cluster 142 may include Container G 148, which is associated with an unknown owner 150.

It should be appreciated that more than three containers may be included within a particular cluster, and that a number of clusters other than two may be included within a database in accordance with one or more embodiments.

Orphan container detector 102 may be in communication with first database 108 and second database 110 and may determine whether any containers within a cluster stored on either of those databases is associated with an unknown owner. After determining that a particular container is associated within an unknown owner, orphan container detector 102 may perform one or more operations to identify a likely owner of each container associated with an unknown owner, such as Container E 132 and Container G 148 in the embodiment shown in FIG. 1.

Orphan container detector 102 may be included in an orphan container management system providing an innovative solution tailored for containerized environments, aiming to address the challenges associated with orphan containers. Utilizing advanced features such as rules engine 104 and orphan container detector 102, the system may ensure precise ownership assignment, efficient identification of orphan containers, and streamlined remediation processes.

Rules engine 104 may apply predefined rules and criteria to deduce ownership assignments for containers. Analyzing container and namespace data, along with metadata, rules engine may utilize rule definitions, evaluation, metadata analysis, and integration with external systems to determine ownership associations for containers for which an owner is unknown.

Orphan container detector 102 may comprise a module which scans a database and/or servers such as first database 108 and second database 110 to identify or pinpoint orphan containers by comparing container data, such as metadata, against ownership information. Using techniques such as database or server querying, event-driven approaches, consistency checks, notification systems, and automated workflows, orphan container detector 102 may efficiently identify and manage orphan containers. Monitoring and reporting mechanisms may provide insights into trends and system effectiveness, for example.

An orphan container management system 101, equipped with sophisticated data modeling, a rules engine 104, and an orphan container detector 102, may provide a comprehensive solution for precise ownership assignment, orphan container detection, and streamlined remediation. An orphan container management system 101 may enable organizations to mitigate risks, enhance security, optimize resource allocation, and improve overall container management efficiency.

Cloud service providers may implement orphan container management system 101 to enhance their container management offerings. Orphan container management system 101 may help ensure proper ownership assignment and detect orphan containers within their cloud environments, providing improved security and resource utilization to their customers.

Large enterprises that utilize containerization for their applications and services may also benefit from orphan container management system 101. For example, orphan container management system 101 may help large enterprises manage and track ownership of containers within different namespaces, ensuring accountability and compliance with internal policies.

Organizations practicing DevOps™ methodologies and using containerization as part of their development and deployment processes may also benefit from orphan container management system 101. For example, such organizations may utilize orphan container management system 101 to streamline container management, detect orphan containers, and facilitate efficient collaboration between development and operations teams.

Container orchestration platforms like Kubernetes™ may integrate orphan container management system 101 to enhance their container management capabilities. Orphan container management system 101 may enable better tracking of container ownership, identification of orphan containers, and automated resolution within an orchestration framework.

Managed service providers offering container management services to their clients may incorporate orphan container management system 101 into their service offerings. For example, orphan container management system 101 may enable managed service providers to deliver efficient management of containers, ensuring proper ownership and timely detection of orphan containers.

Figure 2:
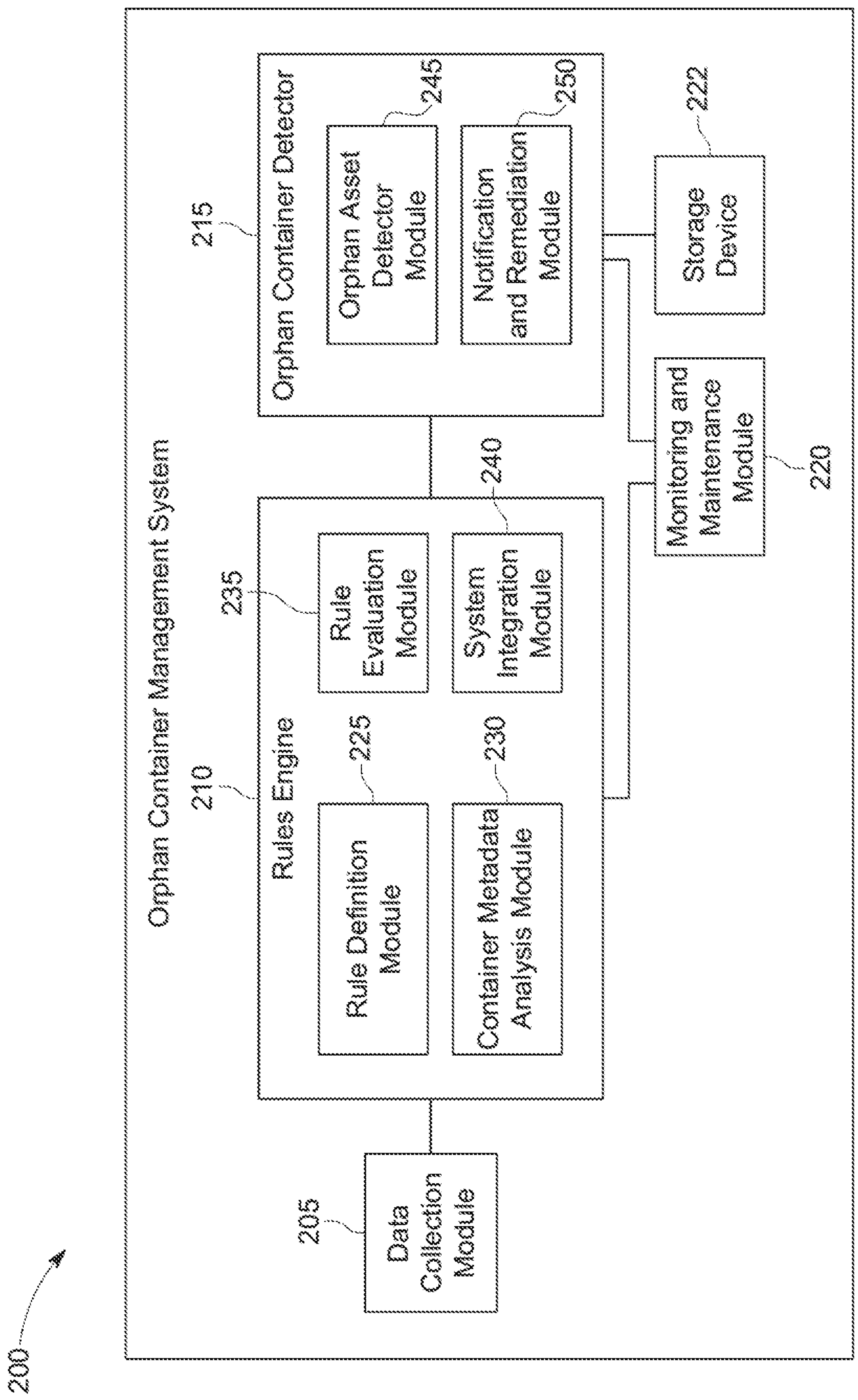
FIG. 2 illustrates an orphan container management system according to an embodiment.

FIG. 2 illustrates an orphan container management system 200 according to an embodiment. Orphan container management system 200 shown in FIG. 2 may be similar to, or the same as, orphan container management system 101 shown in FIG. 1, for example. Orphan container management system 200 may include various components, such as a data collection module 205, a rules engine 210, an orphan container detector 215, a monitoring and maintenance module 220, and a storage device 222. Orphan container management system 200 may include additional and/or different components in accordance with some embodiments. A "module," as used herein, refers to a piece of computer code or executable instructions that provides a specific functionality, for example, in a complex software program. For example, an application program may include various modules which each perform unique functions.

Data collection module 205 may collect container and namespace data from container management tools or container aggregator tools. Container management tools may perform various functions or operations, such as service discovery and load balancing, rollout and rollback automation, storage orchestration, and configuration management, to name just a few examples among many. Data aggregator tools may gather data, compile data, and prepare combined datasets for data processing, for example. A data aggregator tool may collect information based on variables such as age, profession, and similar others and group such collected information to personalize user experience and make choices regarding content, for example. Data aggregator tools may also statistically analyze data and group data. Data collected by data collection module 205 may serve as the foundation for ownership assignment and orphan container detection in accordance with an embodiment.

Rules engine 210 may utilize predefined rules, algorithms, or criteria to deduce the ownership of a container for which an owner is unknown. Rules engine 210 may analyze container and namespace data, container metadata, and other relevant factors to accurately determine and assign ownership of the container.

Rules engine 210 may be designed to handle a relatively large volume of container and namespace data efficiently. Optimization techniques may be implemented, such as caching frequently used data, parallel processing, or distributed computing, to ensure scalability and improve performance.

Rules engine 210 may include various components, such as a rule definition module 225, a container metadata analysis module 230, a rule evaluation module 235, and a system integration module 240, to name just a few example components among many.

Rule definition module 225 may define a set of rules that determine ownership of a container for which ownership is currently unknown based on various factors such as container metadata, namespace associations, organizational hierarchies, contractual agreements, company policies, certain runtime conditions, or custom attributes in accordance with an embodiment. These rules may be expressed using a domain-specific language or implemented as conditional statements, for example.

Container metadata rules may be defined based on specific metadata associated with containers. For example, container metadata rules may be crafted to identify ownership based on labels indicating a particular application stack, version, or environment (e.g., development, testing, production). An example of a container metadata rule is: "If the container has the label 'environment: production,' assign ownership to the DevOps team."

Namespace association rules may be defined based on a particular namespace in which a container resides. Namespace association rules may involve hierarchical ownership assignments based on organizational structures or project groupings. An example of a namespace association rule is: "Assign ownership to the Project Management team if the container belongs to the 'projectA' namespace."

Organization hierarchy rules may comprise rules that reflect an organizational structure, ensuring ownership aligns with departmental responsibilities. An example of an organizational hierarchy rule is: "If the container is part of the 'UI' development team, assign ownership to the UI team."

If ownership of a particular container is governed by contractual agreements or service-level agreements (SLAs), contractual agreement rules may be defined which adhere to these agreements. An example of a contractual agreement rule is: "Assign ownership based on contractual agreements, prioritizing the client's designated support team for containers related to critical services."

Policy-based rules may be developed which are aligned with company policies, ensuring compliance and governance in ownership assignments. An example of a policy-based rule is: "Containers containing sensitive data should be owned by the Security team as per the company's data governance policy."

Dynamic rules may be defined based on particular runtime conditions. For example, dynamic rule adjustments may be made based on runtime conditions, such as container resource usage or specific events. As example of a dynamic rule based on particular runtime conditions is: "If a container experiences high CPU usage, dynamically assign ownership to the team responsible for performance optimization."

Custom attribute(s) rules may be defined based on attributes associated with containers used for specialized ownership assignments. As example of a custom attribute (a) rule is: "Assign ownership based on the custom attribute 'team: operations' for containers in production cluster."

Referring back to FIG. 2, container metadata analysis module 230 may analyze container metadata received from data collection module 205. For example, container metadata analysis module 230 may process container metadata to determine container metadata rules which are used by the rule definition module 225.

Rule evaluation module 235 may comprise a rule evaluation mechanism that applies defined rules to container and namespace data. Rule evaluation may be achieved by utilizing a rule engine framework or by implementing custom logic. A rule evaluation process may compare container and namespace attributes against defined rules to determine an appropriate owner of a container.

Rule evaluation module 235 may implement sequential rule processing, such as where rules are evaluated one after another in a predefined order. Processing rules sequentially in this manner may allow for a structured approach to rule execution. An example of a sequential rule processing rule is: "Evaluate rule 1 first; if the conditions are met, assign ownership accordingly. If not, proceed to rule 2."

Another function which may be performed by rule evaluation module 235 is rule prioritization and conflict resolution. For example, rule evaluation module 235 may assign priorities to rules and establish a systematic process for resolving conflicts when multiple rules apply to a particular container. Clear prioritization may, for example, ensure deterministic ownership assignment. An example of a rule prioritization and conflict resolution rule is: "If Rule A and Rule B both apply to a container, prioritize Rule A for ownership assignment."

An additional function which may be performed by rule evaluation module 235 is dynamic rule activation and/or deactivation. For example, rule evaluation module 235 may enable the dynamic activation or deactivation of rules based on changing conditions. Such adaptability may enable the system to respond to real-time events or adjustments in organizational policies in accordance with an embodiment. An example of a rule for dynamic rule activation and/or deactivation is: "Activate a rule that assigns ownership to the Incident Response team when a container is flagged with a security-related issue."

A further function which may be performed by rule evaluation module 235 is rule logging and auditing. For example, rule evaluation module 235 may implement logging mechanisms to record the results of rule evaluations such as for auditing purposes. A logging and auditing function may assist in tracking ownership assignments and diagnosing issues. An example of a rule for logging and auditing is: "Log the outcome of each rule evaluation, including details like rule ID, container ID, and assigned ownership, for auditing and troubleshooting."

Another function which may be performed by rule evaluation module 235 is implementation of error handling and exception rules. For example, rule evaluation module 235 may define error-handling mechanisms to address scenarios where rule evaluation encounters errors or unexpected conditions. Exception rules may be established to handle such cases gracefully. An example of a rule for error handling and exception is: "If rule evaluation encounters an error, activate an exception rule that assigns ownership to a default team and logs the error for investigation."

Rule evaluation module 235 may also perform a contextual rule activation function. For example, rule evaluation module 235 may activate rules based on contextual information, such as the time of day, the current system load, or the type of container. Such a contextual rule activation function may allow for more nuanced ownership assignments. An example of a rule for contextual rule activation is: "Activate rules specific to maintenance tasks during off-peak hours to ensure the relevant teams are responsible during those times."

Rule evaluation module 235 may additionally perform a rule versioning and rollback function. For example, rule evaluation module 235 may implement versioning for rules and the ability to roll back to previous rule sets. Such a feature may facilitate testing new rule configurations without impacting production ownership assignments. An example of a rule for rule versioning and rollback is: "Roll back to the previous rule version if the latest rules lead to unexpected ownership assignments or disruptions."

An additional function which may be performed by rule evaluation module 235 is concurrency and parallel rule evaluation. For example, rule evaluation module 235 may be designed to evaluate rules concurrently or in parallel, such as in scenarios with a relatively high volume of container data. Concurrency and parallel rule evaluation may enhance overall performance and responsiveness of an ownership assignment process for a container. An example of a rule for concurrency and parallel rule evaluation is: "Leverage parallel processing to evaluate rules for different containers simultaneously, optimizing rule evaluation time."

Rule evaluation module 235 may also perform rule-based notifications. For example, rule evaluation module 235 may integrate rule-based notifications to notify or alert relevant teams or stakeholders when a rule-based ownership assignment occurs. Rule-based notifications may improve transparency and communication in an ownership assignment process for containers. An example of a rule-based notifications is: "Send a notification to the Operations team when a container is assigned ownership based on a rule related to critical system components."

Referring back to FIG. 2, system integration module 240 may integrate rules engine 210 with external systems, such as Identity Access Management (IAM) systems or enterprise directories, to fetch additional ownership-related information, for example. Such integration may enable rules engine 210 to leverage external data sources for ownership determination, enhancing the accuracy of assignment decisions in accordance with an embodiment.

Orphan container detector 215 may include one or more components, such as an orphan asset detection module 245, and a notification and remediation module 250, for example. In accordance with an embodiment, if an owner of an orphan container is initially not found or otherwise determined, if rules engine 210 is subsequently refreshed or updated with new rules, the updated rules engine 215 may be utilized to identify owners of some orphan containers, for example. Ownership of such orphan containers may be updated within orphan container management system 200 via use of a module for assigning owners in accordance with an embodiment.

Orphan asset detection module 245 may scan a database and/or one or more servers in which containers are stored to identify orphan containers. By comparing container data against ownership information, orphan asset detection module 245 may detect containers lacking assigned owners.

System administrators may receive notifications upon identifying orphan containers. Notification and remediation module 250 may, for example, initiate and perform automated remediation processes, including ownership reassignment based on predefined rules, stakeholder notifications, and container termination when necessary, in accordance with an embodiment.

Storage device 222 may store container-owner associations, maintaining a central repository of ownership information. Storage device 222 may facilitate retrieval, management, and querying of ownership data, for example.

Monitoring and maintenance module 220 may ensure ongoing monitoring of container deployments, detect changes in ownership relationships, and periodically validate container-owner associations. Monitoring and maintenance module 220 may facilitate proactive management of ownership assignments and minimizes the occurrence of orphaned containers.

Figure 3:
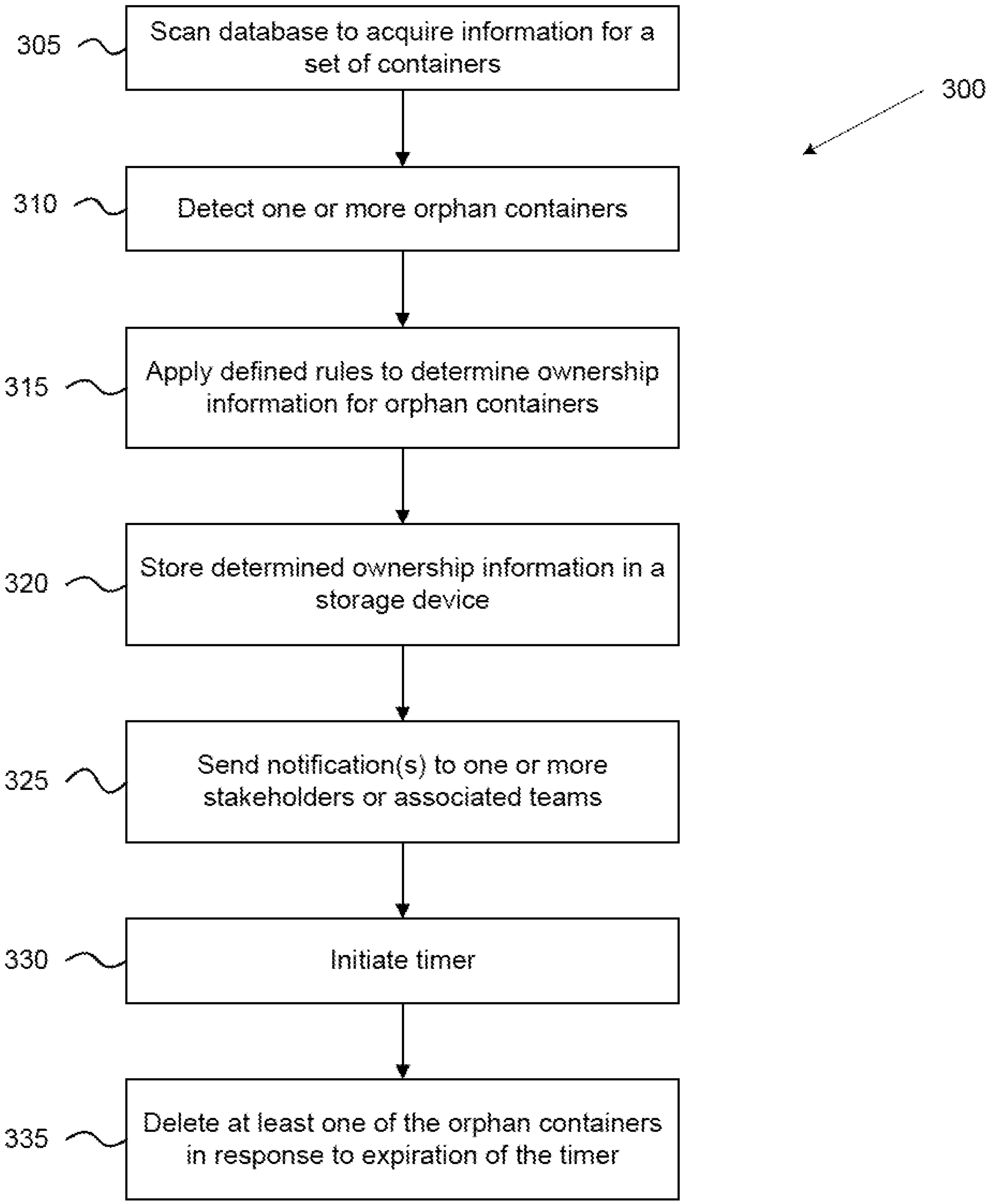
FIG. 3 is a flowchart of a process for detecting and remedying orphan containers according to an embodiment.

FIG. 3 is a flowchart 300 of a process for detecting and remedying orphan containers according to an embodiment. Embodiments in accordance with claimed subject matter may include one or more of operations 305 through 320. Also, the order of operations 305 through 320 is merely an example order. For example, a method in accordance with an embodiment may be performed by a computing device having one or more processors.

At operation 305, a database for a containerized environment may be scanned to acquire information for a set of containers for applications. The acquired information may include at least namespace associations for individual containers of the set of containers and metadata for the individual container. At operation 310, one or more orphan containers within the set of containers for applications may be detected. The one or more orphan containers may be associated with unknown ownership information. At operation 315, defined rules, such as predetermined rules, may be applied to determine ownership information for at least one of the one or more orphan containers based at least in part on the namespace associations and metadata for the at least one of the one or more orphan containers. At operation 320, the determined ownership information for the at least one of the one or more orphan containers may be stored in a storage device.

If there are any remaining orphan containers detected for which ownership information is unable to be determined after applying the defined rules at operation 315, a notification may be sent to one or more associated teams or stakeholders to give the one or more associated teams or stakeholders a chance to claim the remaining orphan containers. For example, an email, text, or some other type of electronic communication may be transmitted to various administrators associated with the one or more associated teams or stakeholders. Such a notification may be automatically transmitted after performing operation 315 and/or operation 320 of FIG. 3. However, if the remaining orphan containers are unclaimed after a certain length of time after transmission of the notification, such as after a seven day period of time, 24-hours, or some other known time limit, the remaining orphan containers may be automatically deleted from the containerized environment. By automatically deleting remaining orphan containers in such a manner, the containerized environment and/or an associated database or operating system may be enabled to function in a more efficient manner. For example, system resources which may otherwise be utilized by remaining unclaimed orphan containers may instead be utilized and/or accessible to containers for which ownership information is known. Moreover, overall system security may also be improved by automatically deleting orphan containers for which ownership information remains unknown.

Referring back to FIG. 3, at operation 325, a notification may be sent to one or more associated teams or stakeholders to give the one or more associated teams or stakeholders a chance to claim any remaining orphan containers, such as discussed above. At operation 330, a timer may be initiated to count down for a known length of time, such as seven days, 24-hours, or some other predefined length of time. If the one or more associated teams or stakeholders claims ownership of the one or more remaining orphan containers such as through use of a user input provided via a user interface, the timer may be stopped and the ownership information for the newly claimed orphan containers may be updated. Deletion of the one or more remaining orphan containers which have been newly claimed may subsequently be inhibited or otherwise prevented based on the received ownership claim. However, if the one or more remaining orphan containers have not been claimed by the time at which the timer expires, the one or more remaining unclaimed orphan containers may be automatically deleted at operation 335.

Figure 4:
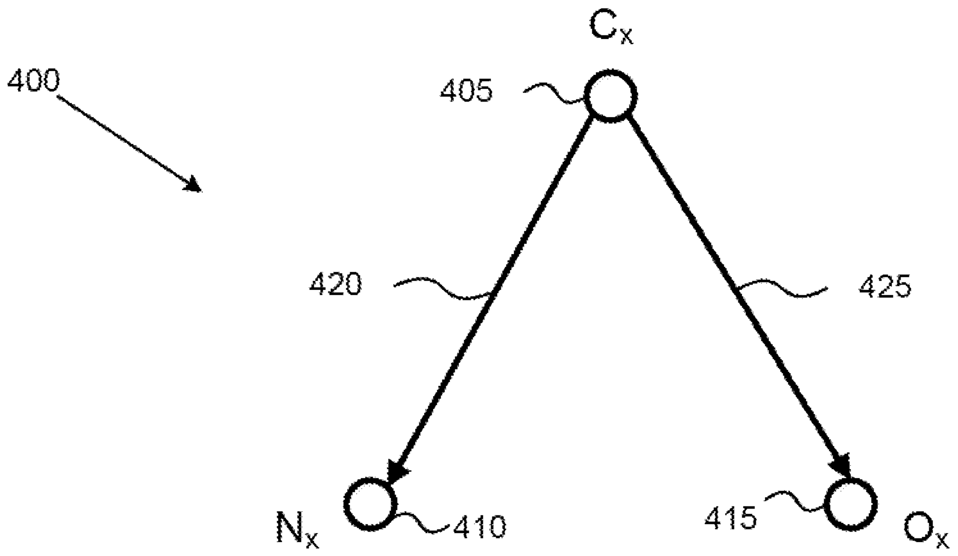
FIG. 4 illustrates a directed graph model to represent relationships between containers, namespaces, and owners according to an embodiment.

FIG. 4 illustrates a directed graph model 400 to represent relationships between containers, namespaces, and owners according to an embodiment. Directed graph model 400 may include three vertices. Vertex Cx 405 may comprise a container vertex, Vertex Nx 410 may comprise a namespace vertex, and Vertex Ox 415 may comprise an owner vertex. A first directed edge 420 may extend from Vertex Cx 405 to Vertex Nx 410. A second directed edge 425 may extend from Vertex Cx 405 to Vertex Ox 415.

A directed graph model may be determined for each individual container instance deployed within a containerized environment. Vertex Cx 405 for a particular container may contain specific attributes for the container such as a container identifier (ID), image name, or other metadata, for example.

Vertex Nx 410 may represent a specific namespace in a particular container is deployed. Each namespace may be denoted as “Nx.” A namespace may provide a logical boundary for organizing containers. Vertex Nx 410 may capture attributes such as namespace ID, name, or any additional metadata, for example.

Vertex Ox 415 may represent an entity which owns or is responsible for a particular container. Each owner may be denoted as “Ox” and may include attributes such as owner ID, name, or other relevant information, for example.

Relationships between the vertices may be defined by directed edges. First edge 420 connects a container Vertex Cx 405 to a namespace Vertex Nx 410, indicating that the container is associated with a particular namespace. This relationship signifies the deployment of a container within a specific namespace. Second edge 425 connects container Vertex Cx 405 to owner Vertex Ox 415, indicating that the container is associated with a particular owner.

A directed graph model 400 may be created for all of the containers within a cluster, such as a Kubernetes™ cluster, and may be stored in a storage device or database. A table may be created to store graph model data for all of the containers in the cluster, where each row represents graph and vertices, and where edges may be stored as properties, for example.

Figure 5:
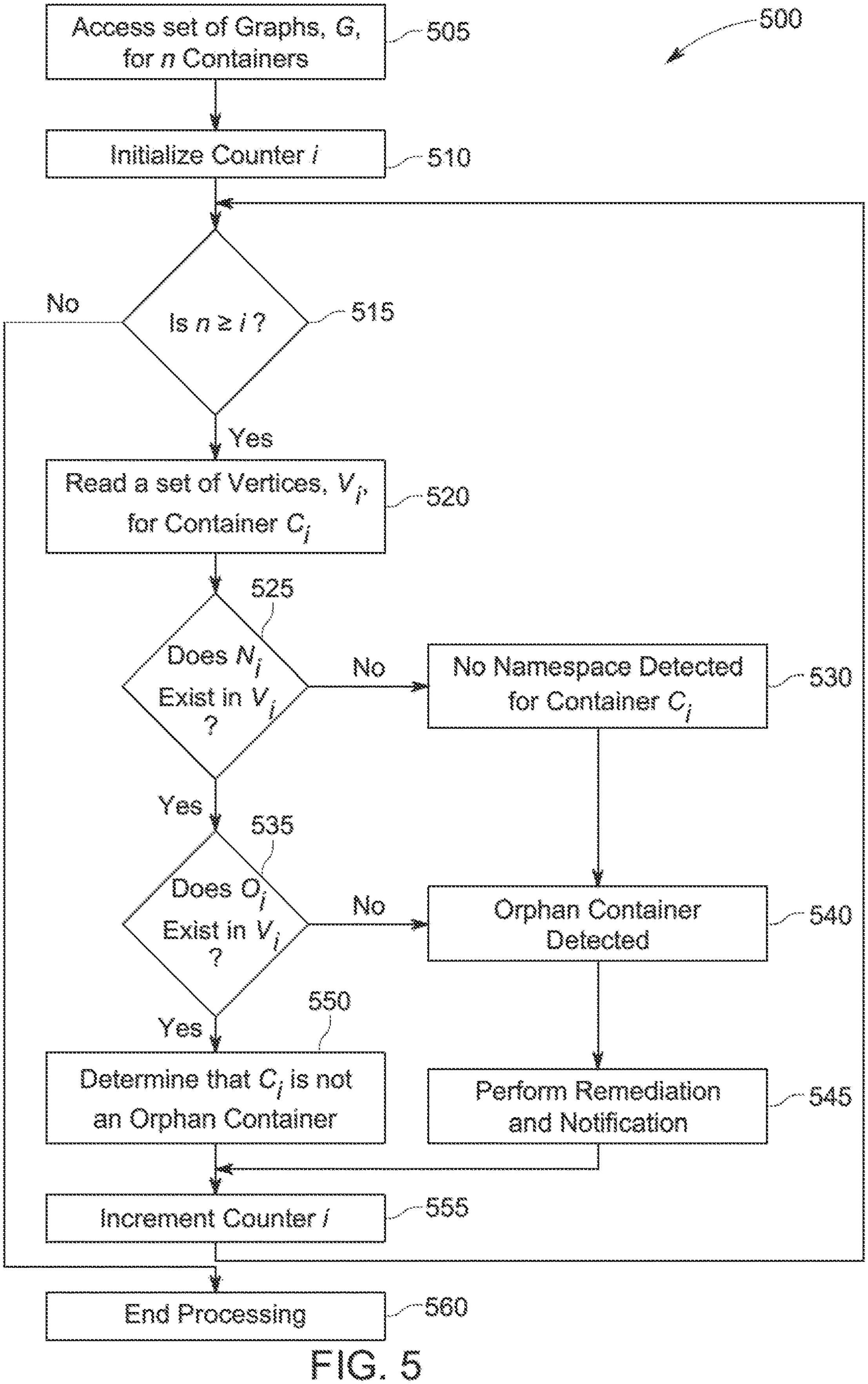
FIG. 5 is a flowchart of a process for detecting and remedying orphan containers according to an embodiment.

FIG. 5 is a flowchart 500 of a process for detecting and remedying orphan containers according to an embodiment. Embodiments in accordance with claimed subject matter may include one or more of operations 505 through 560. Also, the order of operations 505 through 560 is merely an example order. For example, a method in accordance with an embodiment may be performed by a computing device having one or more processors.

At operation 505, a set of graphs, G, may be accessed or otherwise acquired for n containers. For example, there may be a database or one or more servers or other storage devices in which a total of n containers may be located or stored. For each i within the set of n, each container, Ci may be associated with a corresponding graph, Gi.

At operation 510, counter i may be initialized. For example, if each container is designated with an integer subscript, such as C1 for the first container, C2 for the second container, and so forth, counter i may be initialized to a starting value of “1.”

At operation 515, a determination is made as to whether n≥i. If “yes” at operation 515, then counter Ci is within the set of Cn containers, and processing proceeds to operation 520. If “no” at operation 515, processing proceeds to operation 560 where the process ends because Ci falls outside of the scope of the set of n Containers.

At operation 520, a set of vertices, Vi, is read for container Ci. At operation 525, a determination is made as to whether namespace Ni exists within the set of vertices, Vi for the container Ci. In other words, a determination is therefore made as to whether a namespace Ni is included in the set of vertices Vi for container Ci, to indicate that Ci has a namespace association. If “no” at operation 525, a determination is made that there are no namespace associations detected for container Ci, and processing proceeds to operation 540, where a determination is made that Ci is an orphan container. Processing subsequently proceeds to operation 545, where a remediation and notification process is performed to determine an owner of container Ci based on certain rules, as discussed above with respect to orphan container management system 200 of FIG. 2. After operation 545, processing proceeds to operation 555, where counter i is incremented.

Referring back to operation 525, if a determination is made that a namespace, Ni, does exist in the set of vertices Vi associated with container Ci, processing proceeds to operation 535. At operation 535, a determination is made whether an owner vertex, Oi, exists within the set of vertices, Vi associated with container Ci. If “no” at operation 540, processing proceeds to operation 540 whether a determination is made that container, Ci, is an orphan container. If “yes,” on the other hand, at operation 535, processing advances to operation 550, where a determination is made that container Ci is not an orphan container. Processing subsequently advances to operation 555, where counter i is incremented and then processing returns to operation 515 for the next container Ci.

Processing in accordance with flowchart 500 may be performed to identify all orphan containers within a set of n total containers. By storing graph model information in a database for all containers within the database, a process for detecting and remedying orphan containers may be performed in a computationally efficient manner and in a way which optimizes resource allocations, for example. Moreover, database storage may also be enhanced because, for example, some orphan containers which are no longer being utilized may be deleted in order to free up storage space for other containers. Such a process may also improve overall container management and may provide an effective asset management solution for containers, for example.

Figure 6:
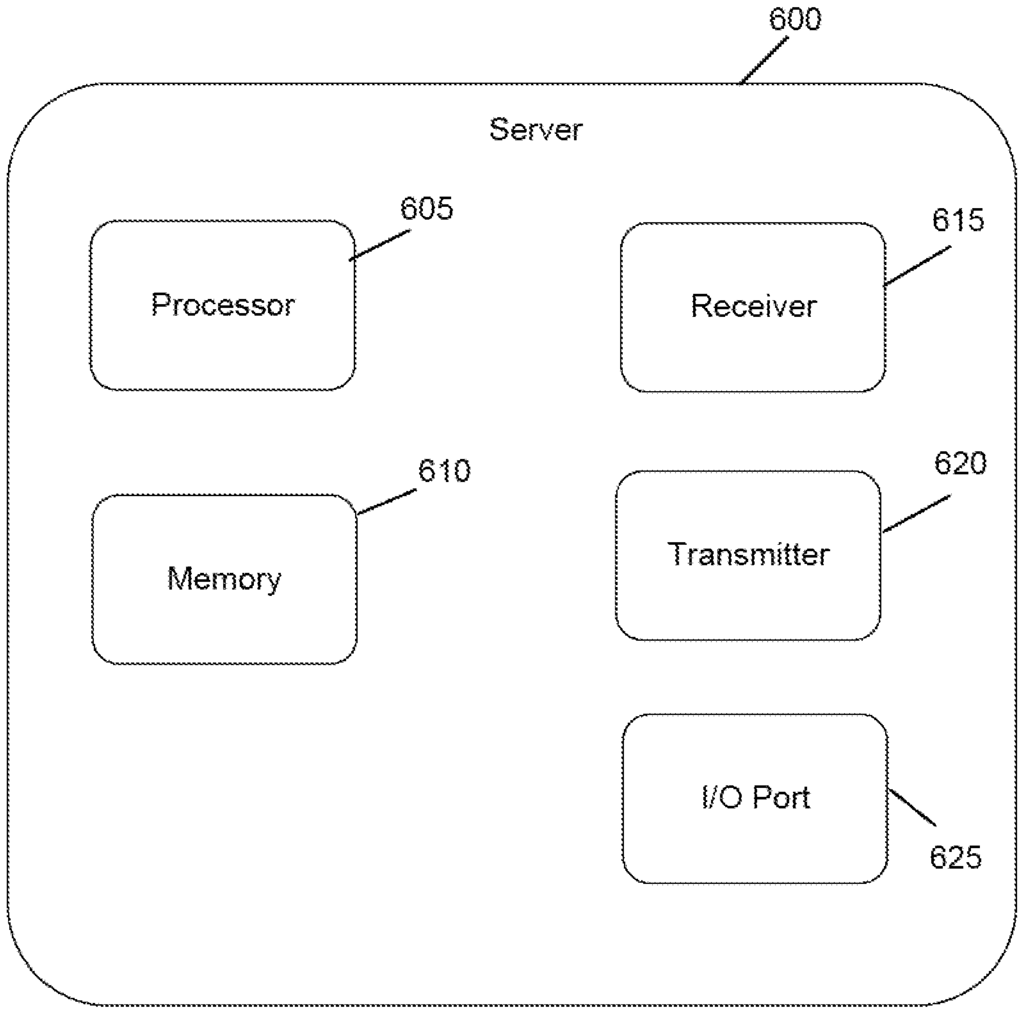
FIG. 6 illustrates a computing device according to an embodiment.

FIG. 6 illustrates a computing device 600 according to an embodiment. Computing device 600 may include a processor 605. Processor 605 may be utilized to execute an application, such as an application which scans a database or server to detect orphan containers in a containerized environment. Computing device 600 may include additional components, such as a memory 610 or other type of storage device, a receiver 615, a transmitter 620, and an Input/Output (I/O) port 625. Processor 605 may execute computer-executable code stored in memory 610 which may be related to an application. For example, computing device 600 may communicate via receiver 615, transmitter 620, and/or I/O port 625.

Some portions of the detailed description are presented herein in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. In accordance with one or more embodiments, an article may comprise a non-transitory storage medium or a non-transitory machine-readable medium on which one or more machine-readable instructions are stored which are executable by a processor, such as a programmable processor, to perform one or more operations.

It has proven convenient at times, principally for reasons of common usage, to refer to such signals as bits, data, values, elements, symbols, characters, terms, numbers, numerals or the like. It should be understood, however, that these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

It should be understood that for case of description, a network device (also referred to as a networking device) may be embodied and/or described in terms of a computing device. However, it should further be understood that this description should in no way be construed that claimed subject matter is limited to one embodiment, such as a computing device and/or a network device, and, instead, may be embodied as a variety of devices or combinations thereof, including, for example, one or more illustrative examples.

The terms, "and", "or", "and/or" and/or similar terms, as used herein, include a variety of meanings that also are expected to depend at least in part upon the particular context in which such terms are used. Typically, "or" if used to associate a list, such as A, B or C, is intended to mean A, B, and C, here used in the inclusive sense, as well as A, B or C, here used in the exclusive sense. In addition, the term "one or more" and/or similar terms is used to describe any feature, structure, and/or characteristic in the singular and/or is also used to describe a plurality and/or some other combination of features, structures and/or characteristics. Likewise, the term "based on" and/or similar terms are understood as not necessarily intending to convey an exclusive set of factors, but to allow for existence of additional factors not necessarily expressly described. Of course, for the foregoing, particular context of description and/or usage provides helpful guidance regarding inferences to be drawn. It should be noted that the following description merely provides one or more illustrative examples and claimed subject matter is not limited to these one or more illustrative examples; however, again, particular context of description and/or usage provides helpful guidance regarding inferences to be drawn.

A network, such as a communication network, may also include now known, and/or to be later developed arrangements, derivatives, and/or improvements, including, for example, past, present and/or future mass storage, such as network attached storage (NAS), a storage area network (SAN), and/or other forms of computing and/or device readable media, for example. A network may include a portion of the Internet, one or more local area networks (LANs), one or more wide area networks (WANs), wire-line type connections, wireless type connections, other connections, or any combination thereof. Thus, a network may be worldwide in scope and/or extent. Likewise, sub-networks, such as may employ differing architectures and/or may be substantially compliant and/or substantially compatible with differing protocols, such as computing and/or communication protocols (e.g., network protocols), may interoperate within a larger network. In this context, the term subnetwork and/or similar terms, if used, for example, with respect to a network, refers to the network and/or a part thereof. Sub-networks may also comprise links, such as physical links, connecting and/or coupling nodes, such as to be capable to transmit signal packets and/or frames between devices of particular nodes, including wired links, wireless links, or combinations thereof. Various types of devices, such as network devices and/or computing devices, may be made available so that device interoperability is enabled and/or, in at least some instances, may be transparent to the devices. In this context, the term transparent refers to devices, such as network devices and/or computing devices, communicating via a network in which the devices are able to communicate via intermediate devices of a node, but without the communicating devices necessarily specifying one or more intermediate devices of one or more nodes and/or may include communicating as if intermediate devices of intermediate nodes are not necessarily involved in communication transmissions. For example, a router may provide a link and/or connection between otherwise separate and/or independent LANs. In this context, a private network refers to a particular, limited set of network devices able to communicate with other network devices in the particular, limited set, such as via signal packet and/or frame transmissions, for example, without re-routing and/or redirecting transmissions. A private network may comprise a standalone network; however, a private network may also comprise a subset of a larger network, such as, for example, without limitation, all or a portion of the Internet. Thus, for example, a private network "in the cloud" may refer to a private network that comprises a subset of the Internet, for example. Although signal packet and/or frame transmissions may employ intermediate devices of intermediate nodes to exchange signal packet and/or frame transmissions, those intermediate devices may not necessarily be included in the private network by not being a source or destination for one or more signal packet and/or frame transmissions, for example. It is understood in this context that a private network may provide outgoing network communications to devices not in the private network, but devices outside the private network may not necessarily be able to direct inbound network communications to devices included in the private network.

While certain example techniques have been described and shown herein using various methods and systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include implementations falling within the scope of the appended claims, and equivalents thereof.

What is claimed is:

1. A method, comprising:

scanning a database for a containerized environment to acquire information for a set of containers for applications, the information including at least namespace associations and metadata for individual containers of the set of containers;

detecting one or more orphan containers within the set of containers for applications, the one or more orphan containers being associated with unknown owner information;

applying defined rules to determine owner information for at least one of the one or more orphan containers based at least in part on the namespace associations and metadata for the at least one of the one or more orphan containers;

storing the determined owner information for the at least one of the one or more orphan containers in a storage device;

initiating a timer in response to detecting at least one remaining orphan container of the one or more orphan containers for which the owner information remains unknown in response to the applying of the defined rules to determine the owner information;

notifying one or more associated teams or stakeholders in response to at least one of:

the determining the owner information for the at least one of the one or more orphan containers, or the detecting the at least one remaining orphan container of the one or more orphan containers for which the owner information remains unknown in response to the applying of the defined rules to determine the owner information;

in response to expiration of the timer, deleting the at least one remaining orphan container for which owner information remains unknown; and in response to receiving a user input from the one or more associated teams or stakeholders claiming ownership of the at least one remaining orphan container, stopping the timer and inhibiting deletion of the at least one remaining orphan container.

2. The method of claim 1, wherein the applying defined rules is based on assigned priorities for the defined rules if conflicting rules apply to the at least one of the one or more orphan containers.

3. The method of claim 1, the defined rules including organizational hierarchy rules.

4. The method of claim 1, the defined rules including contractual agreement rules.

5. The method of claim 1, the defined rules including organization policy-based rules.

6. The method of claim 1, the defined rules including dynamic rules based on runtime conditions.

7. The method of claim 1, the defined rules including custom container attribute rules.

8. The method of claim 1, wherein the applying defined rules includes applying multiple rules in a predefined sequential order.

9. The method of claim 8, wherein the directed graph model comprises a container vertex, an owner vertex, and a namespace vertex, and where a first directed edge is disposed between the container vertex and the owner vertex and a second directed edge is disposed between the container vertex and the namespace vertex.

10. The method of claim 1, further comprising determining a directed graph model for each of the individual containers.

11. An article, comprising:

a non-transitory storage medium comprising machine-readable instructions executable by a processor to perform:

scanning a database for a containerized environment to acquire information for a set of containers for applications, the information including at least namespace associations and metadata for individual containers of the set of containers;

detecting one or more orphan containers within the set of containers for applications, the one or more orphan containers being associated with unknown owner information;

applying defined rules to determine owner information for at least one of the one or more orphan containers based at least in part on the namespace associations and metadata for the at least one of the one or more orphan containers;

storing the determined owner information for the at least one of the one or more orphan containers in a storage device;

initiating a timer in response to detecting at least one remaining orphan container of the one or more orphan containers for which the owner information remains unknown in response to the applying of the defined rules to determine the owner information;

notifying one or more associated teams or stakeholders in response to at least one of:

the determining the owner information for the at least one of the one or more orphan containers, or the detecting the at least one remaining orphan container of the one or more orphan containers for which the owner information remains unknown in response to the applying of the defined rules to determine the owner information;

in response to expiration of the timer, deleting the at least one remaining orphan container for which owner information remains unknown; and in response to receiving a user input from the one or more associated teams or stakeholders claiming ownership of the at least one remaining orphan container, stopping the timer and inhibiting deletion of the at least one remaining orphan container.

12. The article of claim 11, wherein the machine-readable instructions are further executable by the processor to apply multiple rules in a predefined sequential order.

13. The article of claim 11, wherein the machine-readable instructions are further executable by the processor to apply the defined rules based on assigned priorities for the defined rules if conflicting rules apply to the at least one of the one or more orphan containers.

14. A system comprising:

at least one database to store a directed graph information for set of containers for applications in a containerized environment, wherein for an individual container of the set of containers, the directed graph information represents relationships between the individual container, a namespace, and an owner of the individual container;

an orphan container detector to detect one or more orphan containers within the set of containers for applications, the directed graph information for the one or more orphan containers including unknown owner information;

a rules engine to:

apply defined rules to determine owner information for at least one of the one or more orphan containers based at least in part on namespace associations and metadata associated with the directed graph information for the at least one of the one or more orphan containers, initiate a timer in response to detecting at least one remaining orphan container of the one or more orphan containers for which the owner information remains unknown in response to the applying of the defined rules to determine the owner information, notify one or more associated teams or stakeholders in response to at least one of:

the determining the owner information for the at least one of the one or more orphan containers, or the detecting the at least one remaining orphan container of the one or more orphan containers for which the owner information remains unknown in response to the applying of the defined rules to determine the owner information, in response to expiration of the timer, delete the at least one remaining orphan container for which owner information remains unknown;

in response to receiving a user input from the one or more associated teams or stakeholders claiming ownership of the at least one remaining orphan container, stop the timer and inhibit deletion of the at least one remaining orphan container; and a storage device to store the determined owner information for the at least one of the one or more orphan containers in a storage device.

15. The system of claim 14, wherein the directed graph information for the individual container includes a first directed edge between a container vertex and a namespace vertex, and a second directed edge between the container vertex and an owner vertex.

16. The system of claim 14, further comprising a notification and remediation module to notify one or more associated teams or stakeholders in response to determining the owner information for the at least one of the one or more orphan containers.

* * * * *